United States Patent [19]

Fling et al.

[11] Patent Number: 4,589,084
[45] Date of Patent: May 13, 1986

[54] APPARATUS FOR SYMMETRICALLY TRUNCATING TWO'S COMPLEMENT BINARY SIGNALS AS FOR USE WITH INTERLEAVED QUADRATURE SIGNALS

[75] Inventors: Russell T. Fling, Noblesville; Saiprasad V. Naimpally, Indianapolis, both of Ind.

[73] Assignee: RCA Corporation, Princeton, N.J.

[21] Appl. No.: 495,116

[22] Filed: May 16, 1983

[51] Int. Cl.⁴ .......................... G06F 7/38; H04N 9/64
[52] U.S. Cl. ........................................ 364/745; 358/31
[58] Field of Search ................ 364/745, 900 MS File; 358/31

[56] References Cited

U.S. PATENT DOCUMENTS

| | | | |
|---|---|---|---|
| 4,034,196 | 7/1977 | Butterweck et al. | 364/745 |
| 4,034,197 | 7/1977 | Lawrence et al. | 364/72 X |
| 4,095,276 | 6/1978 | Verkroost et al. | 364/72 X |
| 4,195,350 | 3/1980 | Moore | 364/745 |
| 4,280,190 | 7/1981 | Smith | 364/770 |
| 4,340,940 | 7/1982 | Williams, Jr. et al. | 364/745 |

OTHER PUBLICATIONS

T. Fischer, "Digital VLSI Breeds Next-Generation TV Receivers", *Electronics*, Aug. 11, 1981, pp. 97–103.

*Primary Examiner*—James D. Thomas
*Assistant Examiner*—Dale M. Shaw
*Attorney, Agent, or Firm*—E. M. Whitacre; P. J. Rasmussen; E. P. Herrmann

[57] ABSTRACT

Symmetrical truncation of two's complement binary numbers is performed by simply discarding the LSB's of positive values and by adding "one" to the truncated negative value when any one of the discarded LSB's is a logical "one" value. Apparatus to perform an N bit truncation includes an incrementer, a two input AND gate and an N-input OR gate.

18 Claims, 8 Drawing Figures

| (a) | (b) | (c) | (d) | (e) | (f) | (g) | (h) |
|---|---|---|---|---|---|---|---|
| DECIMAL NUMBER | M BIT BINARY | LSB | SIGN BIT | AND OUTPUT | M-1 MSB'S | ADDER OUTPUT | ADDER OUTPUT DECIMAL |
| 4  | 00100 | 0 | 0 | 0 | 0010 | 0010 | 2 |
| 3  | 00011 | 1 | 0 | 0 | 0001 | 0001 | 1 |
| 2  | 00010 | 0 | 0 | 0 | 0001 | 0001 | 1 |
| 1  | 00001 | 1 | 0 | 0 | 0000 | 0000 | 0 |
| 0  | 00000 | 0 | 0 | 0 | 0000 | 0000 | 0 ← POINT OF SYMMETRY |
| -1 | 11111 | 1 | 1 | 1 | 1111 | 0000 | 0 |
| -2 | 11110 | 0 | 1 | 0 | 1111 | 1111 | -1 |
| -3 | 11101 | 1 | 1 | 1 | 1110 | 1111 | -1 |
| -4 | 11100 | 0 | 1 | 0 | 1110 | 1110 | -2 |

*Fig. 7*

| (a) | (b) | (c) | (d) | (e) | (f) | (g) | (h) | (i) |
|---|---|---|---|---|---|---|---|---|
| DECIMAL NUMBER | M BIT REP | N (2) LSB'S | OR OUTPUT | SIGN BIT | AND OUTPUT | INPUT M-N MSB'S | ADDER OUTPUT | ADDER OUTPUT DECIMAL |
| +6 | 00110 | 10 | 1 | 0 | 0 | 001 | 001 | 1 |
| +5 | 00101 | 01 | 1 | 0 | 0 | 001 | 001 | 1 |
| +4 | 00100 | 00 | 0 | 0 | 0 | 001 | 001 | 1 |
| +3 | 00011 | 11 | 1 | 0 | 0 | 000 | 000 | 0 |
| +2 | 00010 | 10 | 1 | 0 | 0 | 000 | 000 | 0 |
| +1 | 00001 | 01 | 1 | 0 | 0 | 000 | 000 | 0 |
| 0  | 00000 | 00 | 0 | 0 | 0 | 000 | 000 | 0 ← P.O.S. |
| -1 | 11111 | 11 | 1 | 1 | 1 | 111 | 000 | 0 |
| -2 | 11110 | 10 | 1 | 1 | 1 | 111 | 000 | 0 |
| -3 | 11101 | 01 | 1 | 1 | 1 | 111 | 000 | 0 |
| -4 | 11100 | 00 | 0 | 1 | 0 | 111 | 111 | -1 |
| -5 | 11011 | 11 | 1 | 1 | 1 | 110 | 111 | -1 |
| -6 | 11010 | 10 | 1 | 1 | 1 | 110 | 111 | -1 |

*Fig. 8*

APPARATUS FOR SYMMETRICALLY TRUNCATING TWO'S COMPLEMENT BINARY SIGNALS AS FOR USE WITH INTERLEAVED QUADRATURE SIGNALS

BACKGROUND OF THE INVENTION

This invention relates to apparatus for symmetrically truncating positive and negative values of two's complemented binary signals. The apparatus is generally applicable to systems which process two's complemented binary signals. However, it has particular utility in processing chrominance signals in digital TV receivers and will be described with reference to this environment.

Truncation of binary numbers involves discarding some of the least significant bits (LSB's) of the binary signal. For binary signals in two's complement format, simple truncation produces an asymmetry between positive truncated numbers and negative truncated numbers. Truncation of positive numbers produces numbers which tend toward zero while truncation of negative numbers produces numbers which tend toward more negative numbers. Specifically, if we chose to retain the (M−N) most significant bits (MSB's) of an M bit number having a decimal value $|V_{10}|$, a positive value is truncated to the most positive integer whose value is less than or equal to $V_{10}/2^N$. On the other hand, a negative value is truncated to the largest integer whose value is more negative than or equal to $-V_{10}/2^N$. For example, truncating the binary equivalent of the decimal number ±13 by simply discarding the two LSB's produces the values of +3 and −4 for the positive and negative values respectively. Suppose that the ±13 values represented the peak values of a digital signal corresponding to a sinusoid centered about zero. It will readily be appreciated that simple truncation of a binary representation of such a sinusoid will introduce a DC shift into the truncated signal. In many applications, the DC shift is insignificant relative to the magnitude of the average peak signal levels. However, in other systems such asymmetry produces undesirable results and must be avoided.

SUMMARY OF THE INVENTION

The present invention truncates two's complement numbers in a symmetrical manner so that truncated values of both positive and negative numbers tend toward zero. Responsive to the sign bit of the two's complement number, the apparatus truncates positive values by simply discarding the N LSB's. When the sign bit indicates the presence of a negative number, the N LSB's are ORed together with the result being added to the LSB of the remaining (M−N) bits of the negative binary number.

BRIEF DESCRIPTION OF THE DRAWINGS

FIGS. 7 and 8 are tables which illustrate binary values exemplifying operation of the FIGS. 4 and 6 circuits.

DETAILED DESCRIPTION OF THE INVENTION

Many digital systems process signals in two's complement format to maintain the signal polarity when signals must go positive and negative. The resolution of the system is established by the number of bit positions selected to represent the signal. For instance, two's complement binary signals of 7 or 8 bits will represent analog values as 128 or 256 quantized levels respectively. An 8 bit two's complement signal corresponds to a zero value, 128 negative and 127 positive possible values.

Frequently, digital processing circuitry will perform a number of successive additions and/or multiplications of M bit binary values. Such manipulations produce results which have larger numbers of bit positions. Maintaining all of the bits requires increasingly larger circuit elements. In order to constrain the circuitry to manageable size, the LSB's are often discarded, i.e. the binary numbers are truncated. The aforedescribed asymmetry attendant simple truncation is of little or no consequence in many systems. In digital TV receivers, however, such truncation asymmetry can produce undesirable color shifts.

Figure 1:
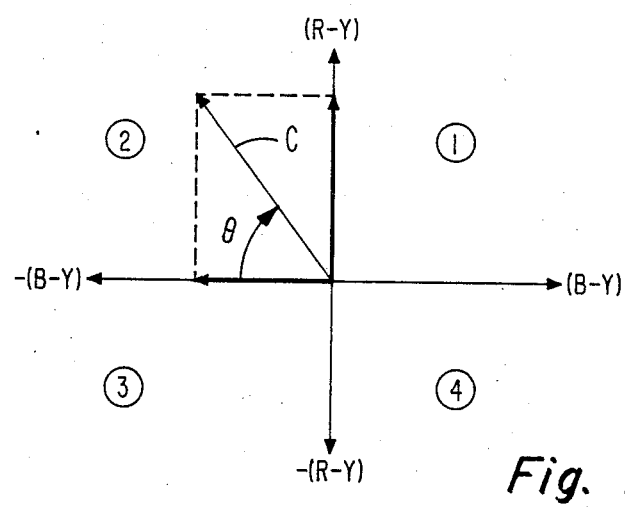
FIG. 1 is a vector diagram of the vector components of a TV chrominance signal.

Referring to FIG. 1, the conventional color or chrominance signal component of a TV signal is shown in vector form. The chrominance signal C is formed by linearly combining two quadrature related color mixture signals shown coincident with the (R−Y) and (B−Y) axes. The phase angle, $\theta$, of the chrominance vector represents the color or hue of the transmitted signal. In a digital TV receiver, the chrominance signal C, in binary format, is demodulated into its vector components for processing. Consider the instantaneous chrominance vector to be in quadrant 2 or 4. In these two quadrants, one of the (R−Y) and (B−Y) color mixture components is positive and the other is negative. If during signal processing the vector components are asymmetrically truncated, the chrominance signal represented by their vector sum will be slightly rotated toward the negative vector component. This rotation can produce a noticeable, objectionable color sift in the displayed image. In particular, assume that the magnitudes of the instantaneous (R−Y) and (B−Y) are 13 units and the chrominance vector is in quadrant 4. Assume also that the binary representations of the (R−Y) and (B−Y) signals are truncated two LSB's resulting in a (B−Y) signal of +3 units and an (R−Y) signal of −4 units. The correct chrominance angle relative to the (B−Y) axis is 45 degress. The angle of the vector sum of the truncated component values is equal to $\tan^{-1} 4/3$ or 53 degrees which is in error by eight degrees.

Figure 2:
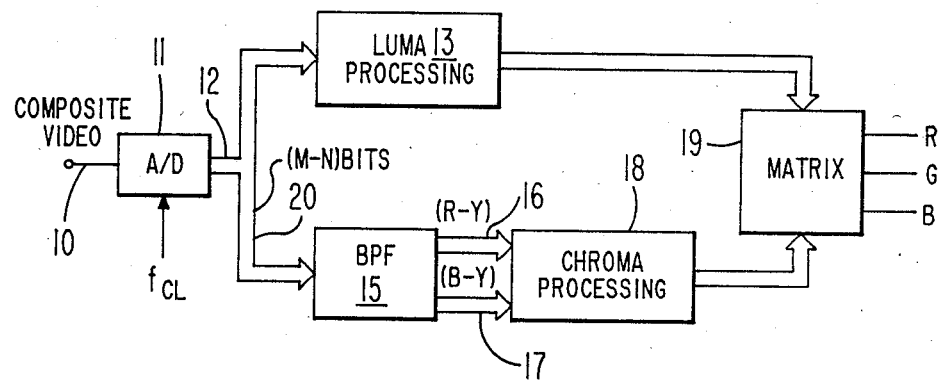
FIG. 2 is a simplified block diagram of signal processing circuitry in a digital TV receiver.
Figure 3:
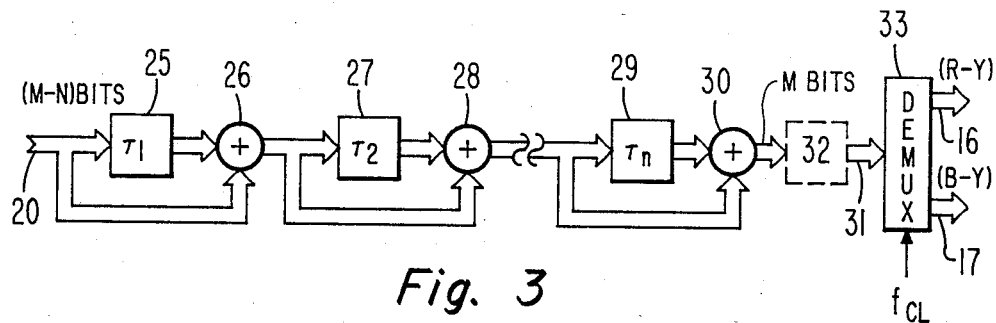
FIG. 3 is a block diagram of one species of a finite impulse response filter and chrominance demodulator.

Referring next to FIGS. 2 and 3, a brief description will be given to illustrate how the color shift may be generated in a digital TV receiver. In FIG. 2, baseband composite analog video signal from a conventional TV receiver tuner and IF section is applied to terminal 10. This signal is digitized in two's complement format in the analog-to-digital converter 11 which is conditioned by a clock signal $f_{CL}$ to sample the analog signal at a clock rate of four times the color subcarrier frequency. The sampling clock $f_{CL}$ is phased to produce the recurring sequence of samples Y+(B−Y), Y+(R−Y), Y−(B−Y) and Y−(R−Y) where Y represents the luminance component of the composite signal and the (R−Y), (B−Y) terms represent the vector components of the chrominance signal. The digitized signal on bus 12 is applied to circuitry 13 wherein the luminance signal is extracted from the digitized composite signal and suitably processed. A digitized output signal from circuit 13 is applied to the matrix 19 where it is combined with the processed color mixture signals (R−Y) and (B−Y) to generate R, G and B color signals to drive the display tube (not shown).

The digitized composite signal on bus 12 is also applied to the input port 20 of bandpass filter 15 which attenuates the luminance component Y to sequentially produce filtered replicas of the (R−Y) and (B−Y) color mixture signals. The sequentially occurring color mixture signals are demultiplexed onto busses 16 and 17 and applied to circuit element 18 where they are suitably processed before being applied to matrix 19.

Typically the bandpass filter 15 will be realized as a linear phase finite impulse response (FIR) filter in which a number of successive additions are performed. FIG. 3 illustrates one such filter, and see, for example, the article "Digital VLSI Breeds Next-Generation TV Receivers", T. Fischer, Electronics, Aug. 11, 1981, pages 97–103. In FIG. 3, elements 25, 27 and 29 are delay stages which delay the digitized signal by one or more sample periods. Elements 26, 28 and 30 are linear binary adders. Each adder has two input ports, one connected for applying signal from the output of the immediately preceding delay element and one connected for applying signal from the input of the immediately preceding delay element. To properly sum all possible combinations of binary signals applied to the input ports of a binary ADDER circuit, the output of each adder must include one more signal bit position than the number of input signal bit positions. Thus, if the digitized two's complement binary signal applied to the input 20 of the FIR filter contains (M−N) bit positions, and the filter includes N adders connected in cascade, the output signal on bus 31 will contain M bit positions. Nominally, the desired information provided by the output signal on bus 31 is contained in the more significant bit positions of the binary signal. To reduce complexity of subsequent circuits, the filtered signal is truncated and this is performed in element 32. The truncated signal from element 32 is then demultiplexed by a clocked gating circuit 33 in a conventional manner.

Note, if the (R−Y), (B−Y) sequence of signals occurring on bus 31 are respectively positive and negative values corresponding to a chrominance vector occurring in quadrant 2 or respectively negative and positive values corresponding to the chrominance vector residing in quadrature 4, and if truncating element 32 produces asymmetrical results for positive and negative signal values, the vector sum of the processed (R−Y) and (B−Y) signals will be slightly rotated from the original chrominance vector and possess a color shift.

Figure 4:
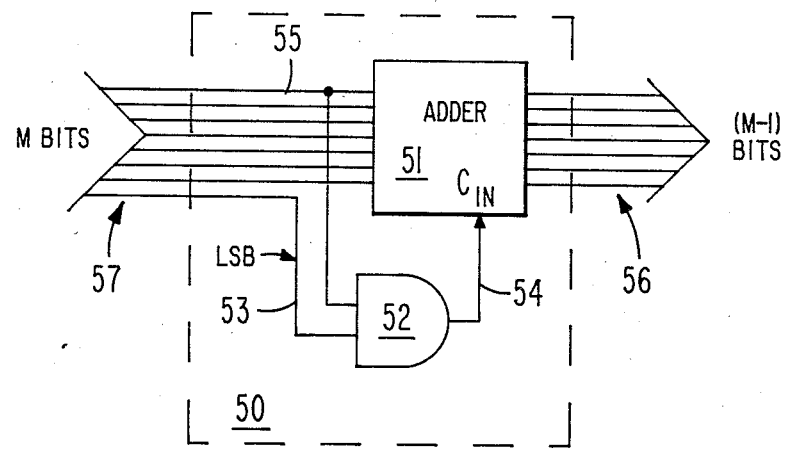
FIGS. 4, 5 and 6 are block diagrams of circuitry for symmetrically truncating two's complement signals embodying the present invention.
Figure 5:
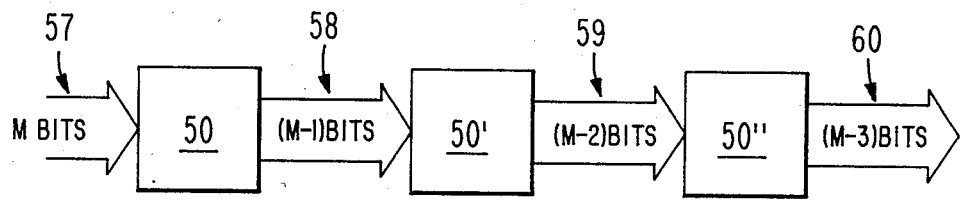
Figure 6:
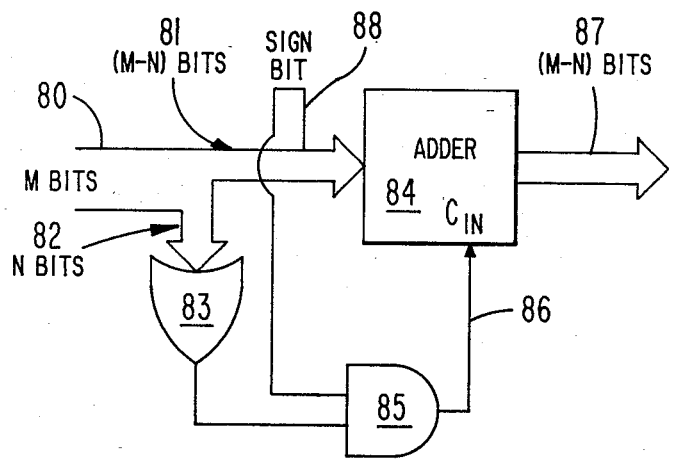

Refer next to the circuits of FIGS. 4–6 which may be substituted for element 32 in FIG. 3 to provide symmetrical truncation of the LSB's of the filtered signal. The circuit of FIG. 4 performs the symmetrical truncation of the applied signal and includes an AND gate 52 and an ADDER 51. ADDER 51 may be of the type which simply increments an applied binary number of one unit responsive to a signal applied to its $C_{in}$ input terminal (see for example U.S. Pat. No. 4,280,190 entitled "Incrementer/Decrementer Circuit") or it may be an (M−1) by (M−1) bit full ADDER with the AND 52 output terminal 54 connected to the LSB position of one the (M−1) bit input ports. As a further alternative, ADDER 51 may be a full ADDER of the type such as the RCA Corporation CD 4008 COS/MOS ADDER wherein the (M−1) MSB's are applied to one input port of the ADDER, logical zero levels are applied to the second input port of the adder and the output of AND gate 52 is applied to the carry-in terminal of the ADDER. M bit data signals are applied at the circuit input 57 and truncated (M−1) bit binary signals are produced at output connection 56. The (M−1) MSB's of the input signal are applied to (M−1) input terminals of ADDER 51. The sign bit and the LSB of the M-bit input signal are applied to respective input terminals of the AND gate 52, the output of which is connected to the $C_{in}$ input terminal of ADDER 51. Whenever the sign bit and LSB of the input word are concurrently a logical one level, the AND gate 52 outputs a logical one level which conditions ADDER 51 to increment the value represented by the (M−1) MSB's of the input word by one unit. Conversely, when the sign bit is a logical zero, as it is for two's complement positive numbers, ADDER 51 passes the (M−1) MSB's of the input signal to the output connection 56 unchanged. The ADDER output 56 provides an (M−1) bit signal corresponding to the M-bit input signal having one bit symmetrically truncated about zero.

The operation of the FIG. 4 apparatus will be described in more detail with reference to the FIG. 7 data table. The columns in the table, from left to right, are (a) a sampling of positive and negative decimal numbers, (b) their two's complement binary equivalents, (c) the LSB of the binary equivalents, which bit position is truncated by the FIG. 4 apparatus, (d) the MSB of the binary equivalents and which correspond to the sign bits ("0" for positive values, "1" for negative values), (e) the output of AND gate 52 corresponding to the respective products of the respective MSB times the respective LSB, (f) the asymmetrically truncated (M−1) bits of the M bit input signal applied to the ADDER 51, (g) the symmetrically truncated (M−1) bit words produced at the adder inputs and (h) their decimal equivalents. Examination of columns (b) and (g) indicates that for positive numbers, truncation corresponds to the LSB being simply discarded. The sign bit of positive numbers is a logical zero which when applied to AND gate 52 conditions its output to also assume a logic zero. In this state, AND gate 52 has no control of ADDER 51 and the (M−1) MSB's of the input signal are simply translated to the ADDER output.

For negative numbers, the sign bit is a logical one and the output 54 of AND gate 52 will correspond to the logical level of the LSB of the input word. Each occurrence of a logic one level of the LSB produces a logic one level at the output of AND gate 52 which in turn conditions the ADDER to increment the (M−1) MSB input signal by one unit. This can be seen by examining columns (c), (f) and (g) of the FIG. 7 table. That the circuit symmetrically truncates about zero is evidenced by the decimal equivalents of the ADDER output signals. Note the decimal equivalents for the (M−1) MSB's applied to the ADDER input, on the other hand, are from top to bottom, 2, 1, 1, 0, 0, −1, −1, −2, −2 which illustrates the asymmetry about zero created by simply discarding the LSB for all values.

The circuit of FIG. 4 can be cascaded with similar circuits, as in FIG. 5, to provide multiple bit truncation.

N cascaded circuits will truncate the input signal N bit positions.

The embodiment of FIG. 6 is capable of truncating an M bit data word by N bits in a single stage. This circuit differs structurally from the FIG. 4 circuit by the inclusion of the logical OR gate 83. An M bit data word is applied to the circuit input port 80 and a truncated (M−N)-bit data word is provided at output port 87. The N-LSB's of the input word are applied to respective input connections of OR gate 83 and the (M−N) MSB's are applied as input signal to (M−N) input terminals of ADDER 84. The sign bit and the output of the OR gate 83 are applied to respective inputs of AND gate 85. The output signal from AND gate 85 is connected to the $C_{in}$ input terminal of ADDER 84 as in the FIG. 4 apparatus. A logical one signal from AND gate 85 conditions ADDER 84 to increment, by one unit, the value represented by the (M−N) input bits applied to the ADDER. AND gate 85 produces a logical one signal whenever the sign bit and any one of the N-LSB's applied to OR 83 are concurrently logical one values. This of course can only occur for negative numbers.

FIG. 8 is a table showing the logical states at various points of the FIG. 6 circuit for ±6 values about zero for a circuit which truncates the two LSB's of an applied input signal. One skilled in the art of signal processing will readily trace through the FIG. 8 table to verify the symmetrical truncation provided by the FIG. 6 circuit. Note, column (d) is the logical result of ORing the two LSB's (col. (c)) of the col. (b) data values. Col. (f) is the result of ANDing the sign bits (col. (e)) with the ORed LSB's (col. (d)). Finally, the FIG. 6 output signal (col. (h)) is the binary sum of the MSB's (col. (g)) of the truncated binary input signal (col. (b)) and the output of the AND gate 85 (col. (f)).

What is claimed is:

1. Apparatus for truncating an M-bit two's complement binary signal to (M−N) bits wherein the MSB of the M bit signal is a sign bit and M and N are integers, said apparatus comprising:
    an input port for applying said M-bit binary signal;
    means coupled to said input port, and responsive to the N LSB's of said M-bit binary signal and the MSB of said M-bit binary signal for producing a control signal whenever at least one of said N LSB's of the M-bit binary signal and the MSB of said M-bit binary signal are concurrently in a logical one state;
    means coupled to said input port, and responsive to said control signal, for incrementing by one unit the (M−N) MSB's of said M-bit binary signal and providing the incremented (M−N) MSB's as a truncated (M−N)-bit binary signal, and in the absence of said control signal providing the (M−N) MSB's of said M-bit binary signal as a truncated (M−N)-bit binary signal.

2. The apparatus set forth in claim 1 wherein the means for producing said control signal is a logical AND gate having a first input terminal connected to the MSB of said M-bit binary signal and a second input coupled to said N LSB's of said M-bit binary signal.

3. The apparatus set forth in claim 2 wherein the second input of said logical AND gate is coupled to said N LSB's of said M-bit binary signal by a logical OR gate having respective input terminals connected to said N LSB's and an output terminal connected to said AND gate.

4. The apparatus set forth in claim 3 wherein the means for incrementing the (M−N) MSB's of said M-bit binary signal is a binary adder having an input port with at least (M−N) binary input connections coupled to respective ones of the (M−N) MSB's of the means for applying said M-bit binary signal and having a carry-in input terminal connected to said AND gate.

5. The apparatus set forth in claim 2 wherein the integer N equals one and includes a second similar apparatus in cascade connection therewith.

6. The apparatus set forth in claim 1 wherein the means for incrementing the (M−N) MSB's of said M-bit binary signal is a binary incrementing circuit having at least M−N input terminals connected to the (M−N) MSB's of said means for applying an M-bit binary signal and having a incrementing-control input terminal connected to the means for producing said control signal.

7. The apparatus set forth in claim 1 wherein the means for incrementing the (M−N) MSB's of said M-bit binary signal is a binary adder having an input port with at least (M−N) binary input connections coupled to the (M−N) MSB's of the means for applying said M-bit binary signal and having a carry-in input terminal coupled for receiving said control signal.

8. In a digital TV receiver including a source of two's complement binary signals and circuitry for processing said binary signals, which circuitry tends to increase the number of bit positions of the processed signal to M bit positions, apparatus for symmetrically truncating said M-bit binary signals to (M−N) bits where M and N are integers, said apparatus comprising:
    an input port for applying said M-bit binary signals;
    means coupled to said input port, and responsive to the N LSB's of said M-bit binary signal and the MSB of said M-bit binary signal for producing a control signal whenever at least one of said N LSB's of the M-bit binary signal and the MSB of said M-bit binary signal are concurrently in a logical one state;
    means coupled to said input port, and responsive to said control signal for incrementing by one unit the (M−N) MSB's of said M-bit binary signal and providing the incremented (M−N) MSB's as a truncated (M−N)-bit binary signal, and in the absence of said control signal providing the (M−N) MSB's of said M-bit binary signal as a truncated (M−N)-bit binary signal.

9. The apparatus set forth in claim 8 wherein the means for producing said control signal is a logical AND gate having a first input terminal connected to the MSB of said M-bit binary signal and a second input coupled to said N LSB's of said M-bit binary signal.

10. The apparatus set forth in claim 9 wherein the second input of said logical AND gate is coupled to said N LSB's of said M-bit binary signal by a logical OR gate having respective input terminals connected to said N LSB's and an output terminal connected to said AND gate.

11. The apparatus set forth in claim 8 wherein the means for incrementing the (M−N) MSB's of said M-bit binary signal is a binary incrementing circuit having at least M−N input terminals for applying the (M−N) MSB's of said M-bit binary signal and having a incrementing-control input terminal connected to the means for producing said control signal.

12. The apparatus set forth in claim 8 wherein the means for incrementing the (M−N) MSB's of said M-bit binary signal is a binary adder having an input port with at least (M−N) binary input connections coupled to receive the (M−N) MSB's of said M-bit binary signal and having a carry-in input terminal coupled for receiving said control signal.

13. In a digital TV receiver including a source of two's complement binary signal corresponding to composite video signal and digital circuitry for processing a chrominance component of said composite binary signals, which circuitry tends to increase the number of bit positions of the processed binary signal to M bit positions, apparatus for symmetrically truncating said M-bit binary signals to (M−N) bits, where M an N are integers, said apparatus comprising:

an input port for applying said M-bit binary signals;

means coupled to said input port, and responsive to the N LSB's of said M-bit binary signal and the MSB of said M-bit binary signal for producing a control signal whenever at least one of said N LSB's of the M-bit binary signal and the MSB of said M-bit binary signal are concurrently in a logical one state;

means coupled to said input port, and responsive to said control signal for incrementing by one unit the (M−N) MSB's of said M-bit binary signal and providing the incremented (M−N) MSB's as a truncated (M−N)-bit binary signal, and in the absence of said control signal providing the (M−N) MSB's of said M-bit binary signal as a truncated (M−N)-bit binary signal.

14. The apparatus set forth in claim 13 wherein the means for producing said control signal is a logical AND gate having a first input terminal connected to the MSB of said M-bit binary signal and a second input coupled to said N LSB's of said M-bit binary signal.

15. The apparatus set forth in claim 14 wherein the second input of said logical AND gate is coupled to said N LSB's of said M-bit binary signal by a logical OR gate having respective input terminals connected to said N LSB's and an output terminal connected to said AND gate.

16. The apparatus set forth in claim 13 wherein the means for incrementing the (M−N) MSB's of said M-bit binary signal is a binary incrementing circuit having at least M−N input terminals for applying the (M−N) MSB's of said M-bit binary signal and having a incrementing-control input terminal connected to the means for producing said control signal.

17. The apparatus set forth in claim 13 wherein the means for incrementing the (M−N) MSB's of said M-bit binary signal is a binary adder having an input port with at least (M−N) binary input connections coupled to receive the (M−N) MSB's of said M-bit binary signal and having a carry-in input terminal coupled for receiving said control signal.

18. The method of truncating M-bit two's complement binary signals to (M−N)-bit two's complement signals, where M and N are integers, comprising:

discarding the N LSB's of said binary signals and outputting the (M−N) MSB's of said binary signals for all positive values of signals and for negative values of signals that do not contain logical ones in their N LSB positions; and discarding the N LSB's of said binary signals and algebraically adding a positive one unit to the (M−N) MSB's of said binary signals and outputting the incremented (M−N) MSB's of said binary signals for negative values of signals whenever any one of the N LSB's of said negative values is a logical one.

* * * * *